April 22, 1958  C. K. FULK  2,831,638
AIR CONTROL DEVICE

Filed July 14, 1954  2 Sheets-Sheet 1

Chester K. Fulk
INVENTOR.

BY
Attorneys

April 22, 1958  C. K. FULK  2,831,638
AIR CONTROL DEVICE
Filed July 14, 1954  2 Sheets-Sheet 2

Chester K. Fulk
INVENTOR.

BY *Thomas A. O'Brien*
and *Harvey B. Jackson*
Attorneys ced Apr. 22, 1958

2,831,638

AIR CONTROL DEVICE

Chester K. Fulk, Freedom, Ind.

Application July 14, 1954, Serial No. 443,222

3 Claims. (Cl. 236—49)

This invention relates to an air control device, and particularly to an intermittently operated air controller for controlling the ventilation in an animal or poultry housing enclosure.

In the housing of livestock, poultry and the like, considerable difficulty is encountered because of the heat and moisture exuded by the animals, and particularly in poultry housing is it noticeable that the moisture produced by the animals causes dampness of the litter or floor covering in the enclosure. Also, it is noted that extreme fumes of ammonia or other noxious odors are present in such animal enclosures. It is accordingly highly desirable that the air be constantly moved out of the enclosure to provide clean, fresh air therein, to control the temperature in the enclosure and to remove the moisture from the enclosure so that the litter or bedding does not become damp. It is equally important that the air should not be moved fast enough to cause drafts in the enclosure or to cause unusual lowering of temperature therein particularly with the variation of the temperature outside the enclosure.

In accordance with the present invention, a control device is provided having means for causing a gain in temperature on a thermostatic regulating device which is partially responsive to the temperature in the enclosure and partially responsive to a heat producing device adjacent to the thermostatic element.

In a construction according to the invention, a spiral type bimetal thermostat is mounted in a housing which is responsive to the temperature in the enclosure and having a switch operated by the temperature changes applied to the thermostat and a heating element mounted adjacent to the thermostat and operative in the "off" position of the switch to supply heat to the thermostat to cause a gain in temperature of the thermostat over the temperature of the enclosure. It will thus be seen that in warm conditions, the temperature of the room or enclosure will cause operation of the thermostat irrespective of the operation of the light device and that in normal temperatures, the light device or heating device mounted adjacent to the thermostat will cause intermittent operation thereof so that the temperature of the room will be reduced to a point to cause shut-off of the thermostatic element and at extreme low temperatures, the device will be substantially inoperative so that cold air will not be drawn in to unduly chill the air within the enclosure.

It is the primary object of the present invention, then, to provide an automatic system by means of which an increase in the temperature of the atmosphere in an animal enclosure, such as a fowl brooder house, above a predetermined and selective value, will cause energization of a fan to induct outside air and to drive the hot, humid, foul air out of the enclosure. It is a further, and highly important, feature of the invention so to design the system that the intervals between periods of fan operation shall be relatively short, and that, except in extremely cold weather, the fan will be periodically energized even though the temperature of the atmosphere in the building does not rise substantially above the optimum value.

A further object of the invention is to provide an improved controller.

It is a further object of the invention to provide a controller having a temperature gain device mounted thereon.

It is a further object of the invention to provide a controller having means for maintaining the ventilating fan at operating temperatures at all times.

Other objects and many of the attendant advantages of the present invention will be apparent from the following detailed description taken in conjunction with the accompanying drawing in which.

Figure 2:
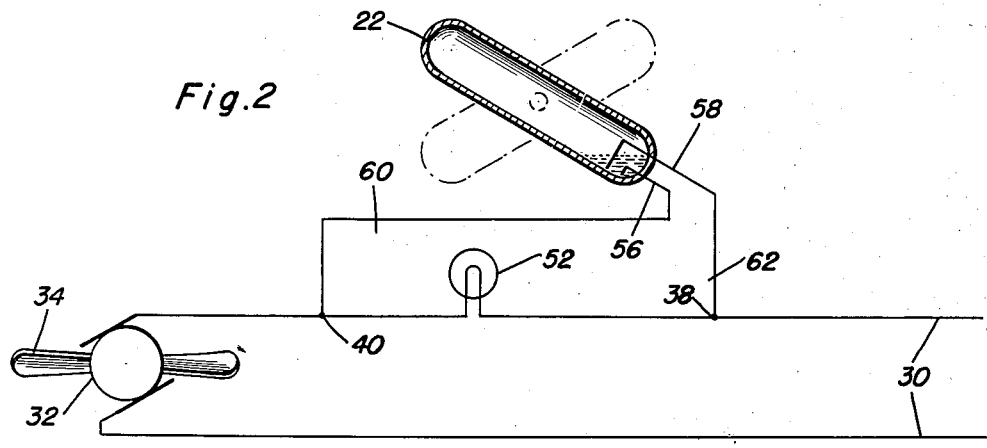
Figure 2 is a schematic wiring diagram showing the operation of one type of controller.

In the exemplary construction according to the invention, a housing 10 is provided with a cover 12 and within the housing is mounted a bimetal thermostat 14 arranged in spiral form and having one end 16 anchored to a control arm 18. The inner end of the spiral member 14 is connected to a rotary shaft 20 on which is mounted a position type switch herein indicated as a tubular mercury switch 22.

The arm 18 is provided with an adjusting knob 24 so that it may be readily adjusted to various positions so that the thermostatic element will operate the switch 22 at various temperatures. Preferably, the cover 12 is provided with a window 26 through which a suitable dial 28 may be observed, and the end of the arm 18 may be seen in cooperation with the dial 28 so that the device may be set to operate at any desired temperature.

A supply circuit 30 is provided for supplying energy to a fan motor 32 which operates a ventilating fan 34. A terminal panel 36 is mounted within the housing 10, and the terminals of one side of the circuit 30 are directly connected to the motor 32 and the other side is provided with terminals 38 and 40 which connect the terminal members 42 and 44 mounted on the terminal board 36. A lamp socket 46 is provided adjacent the thermostatic element 14 and is supported in position by means of relatively stiff wiring connections 48 connected to the terminal 40 and a connection 50 connected to the terminal 38. A resistance type device, such as an incandescent lamp 52 is mounted in the socket 46 and preferably is of relatively low wattage so that a relatively small amount of heat will be produced thereby. The switch 22 is provided with terminals 56 and 58 with the terminal 56 being connected to the terminal 42 by means of a conductor 60. Likewise, the terminal 58 is connected with the terminal 44 by means of a conductor 62. It will be noted that in this form of the device, when the switch 22 is in one position, the terminals 56 and 58 will be shorted, directly connecting the motor across the input line 30 and in the other position, the terminals 56 and 58 will be open so that the lamp device or resistance device 52 is connected in series circuit relation with the circuit 30 and the motor 32 so that the energy necessary to operate the light will also flow through the motor so that the motor will be kept in warm condition or operative condition in cold weather, but without driving the motor.

In the operation of the device according to this form of the invention, the controller 10 with its cover 12 will be mounted in a space where the air is to be controlled, and that thermal temperatures of the lamp 52 will cause an accumulation of heat within the housing and the cover so that the thermostatic element 14 will have a gain with respect to the temperature of the enclosure and after a predetermined interval, the switch 22 will operate to energize the motor 32 and de-energize the lamp 52 so that the motor will run to cause the flow of fresh air into the enclosure and the exhaust of the foul air therefrom. Since the lamp 52 will be de-energized, the cooling of the space because of the incoming cool air will cool the thermostatic element 14 which will again move to the initial operating position to energize the lamp 52 and de-energize the connectors 60 and 62 so that the current flowing to the motor will be inadequate to produce operation thereof but will be sufficient to maintain its temperature in an operating condition so that oil will not congeal or the like.

It will be apparent that when the temperature outside is hot, the temperature of the enclosure will augment the temperature produced by the lamp 52 so that the motor will be turned on much more frequently and will run for longer intervals than during colder weather. Consequently, the enclosure will be cooled in direct consequence of the higher outside temperature. At very low outside temperatures, it will be apparent that the cool air will almost immediately cool down the thermostat 14 so that there will not be any undue chilling of the enclosure, and the thermostat 14 will operate at much longer intervals than at higher temperatures so that the temperature of the enclosure will not be unduly lowered, but the fan will operate at intermittent intervals to remove the foul air with the length of intervals between the operation almost directly dependent upon the cold outside.

Figure 3:
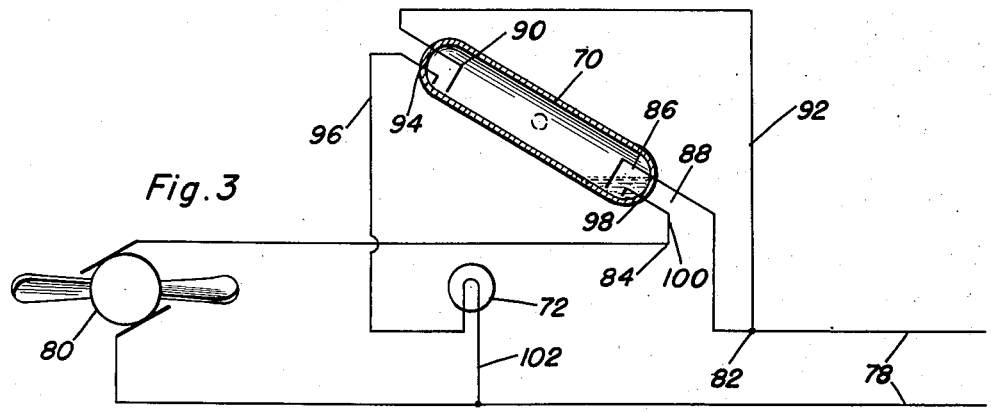
Figure 3 is a similar view showing a modification according to the invention.
Figure 1:
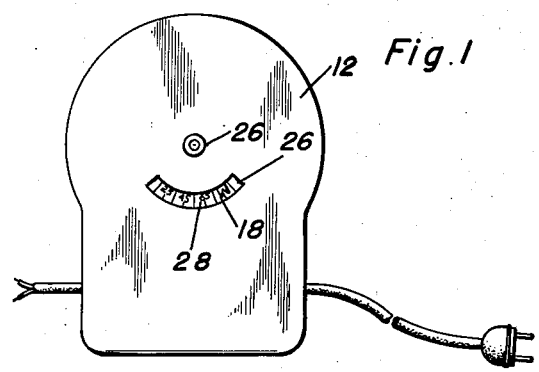
Figure 1 is a front elevation of the controller according to the invention.
Figure 4:
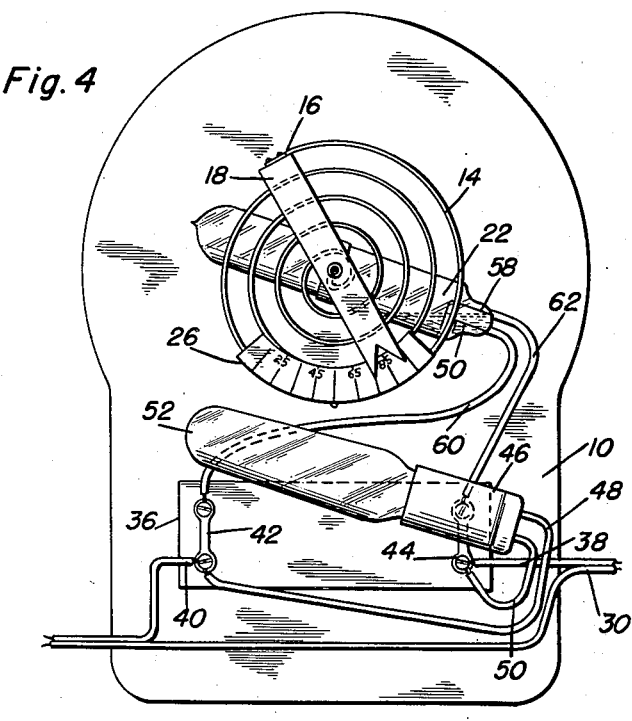
Figure 4 is an enlarged front elevation of the controller with the cover removed.
Figure 5:
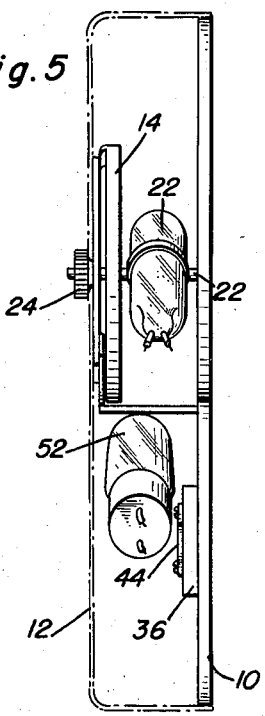
Figure 5 is a cross-section through the controller showing the positioning and arrangement of the parts therein.
Figure 6:
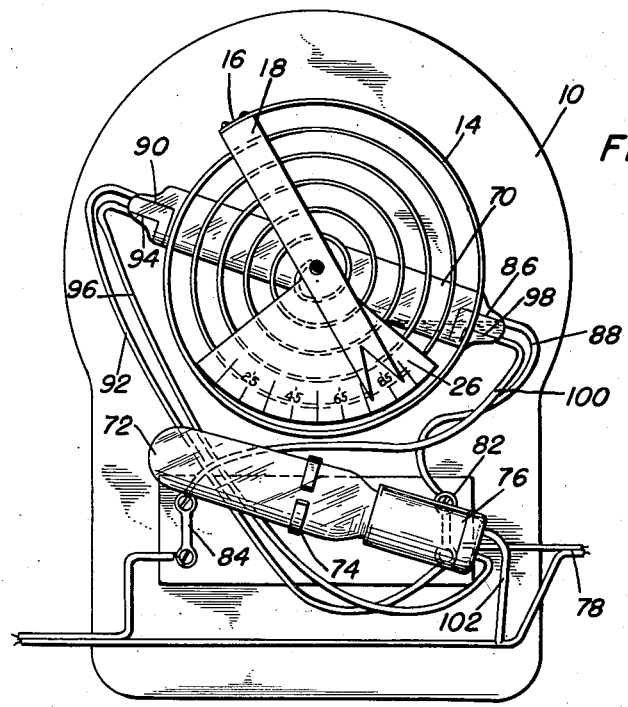
Figure 6 is a front elevation similar to Figure 4 showing a modified form according to the invention.

In a modification according to Figures 3 and 6, the thermostatic element 14 will have the same control arm 18 operating over the dial 28'. The switch element 70 of the double-ended variety will be mounted for operation by the thermostat 14 and a lamp 72 will be supported by means of a clamp 74 so that relatively flexible leads may be connected to the lamp socket 76. Supply circuit 78 will have one side directly connected to one side of the lamp 72 and to one side of the motor 80 while the other side is connected to a terminal 82 and a terminal 84. The terminal 84 will be connected to a terminal 86 at one end of the switch 70 by means of a conductor 88 and also will be connected to a terminal 90 in the other end of the switch by means of a conductor 92. The terminal 94 associated with the terminal 90 in the switch 70 will be connected to lamp 72 by means of the conductor 96.

Likewise, the terminal 98 associated with the terminal 86 will be connected to the terminal 84 by means of the conductor 100. The lamp 72 will be connected to the other side of the circuit 78 by means of the conductor 102.

In the operation of this form of the invention, in one position of the switch 70, the motor 80 will be directly connected across the supply circuit 78 and the lamp 72 will be de-energized. In the other position of the switch 70, the lamp 72 will be directly connected across the supply circuit 78 and the motor will be completely de-energized. It will thus be apparent that in this form of the invention, no current will flow through the motor 80 during the "off" period thereof so that the motor may be mounted in a much warmer location than the motor of Figure 2.

For purposes of exemplification, particular embodiments of the invention have been shown and described according to the best present understanding thereof. However, it will be apparent to those skilled in the art that various changes and modifications in the construction and arrangement of the parts thereof may be readily resorted to without departing from the spirit and scope of the invention.

What is claimed as new is as follows:

1. An atmospheric control system for an animal enclosure comprising a fan mounted to cause, whenever said fan is driven, a flow of inside air out of said enclosure and a flow of outside air into said enclosure, an electric motor connected to drive said fan, an energizing circuit for said motor, thermo-responsive means dominating said circuit and located within, and subject to the temperature of the ambient atmosphere in, said enclosure, electrically-energized heater means located closely adjacent said thermo-responsive means and effective, when energized, to raise the temperature of said thermo-responsive means to a value above that of the ambient atmosphere within said enclosure, said thermo-responsive means being effective to close said motor-energizing circuit only whenever the temperature of said thermo-responsive means is above a predetermined value, and an energizing circuit for said heater means dominated by said thermo-responsive means and effective to energize said heater means only when said motor-energizing circuit is de-energized, whereby said fan will be continuously driven whenever the ambient temperature within said enclosure is above a predetermined maximum, will be continuously undriven whenever such ambient temperature is below a predetermined minimum, and will be intermittently driven whenever such ambient temperature is between such maximum and minimum values.

2. An atmospheric control system for an animal enclosure comprising a fan mounted to cause, whenever said fan is driven, a flow of inside air out of said enclosure and a flow of outside air into said enclosure, an electric motor connected to drive said fan, an energizing circuit for said motor, a switch in said circuit, thermo-responsive means dominating said switch and located within, and subject to the temperature of the ambient atmosphere in, said enclosure, and electrically-energized heater means located closely adjacent said thermo-responsive means and effective, when energized, to raise the temperature of said thermo-responsive means to a value above that of the ambient atmosphere within said enclosure, said thermo-responsive means being effective to close said switch only whenever the temperature of said thermo-responsive means is above a predetermined value, said heater means being shunt connected in said circuit around said switch whereby said heater means is energized only whenever said switch is open, whereby said fan will be continuously driven whenever the ambient temperature within said enclosure is above a predetermined maximum, will be continuously undriven whenever such ambient temperature is below a predetermined minimum, and will be intermittently driven whenever such ambient temperature is between such maximum and minimum values.

3. An atmospheric control system for an animal enclosure comprising a fan mounted to cause, whenever said fan is driven, a flow of inside air out of said enclosure and a flow of outside air into said enclosure, an electric motor connected to drive said fan, an energizing circuit for said motor, an electrically energized heater means, an energizing circuit for said heater means, a first switch in said motor-energizing circuit, a second switch in said energizing circuit for said heater means, and thermo-responsive means located within, and subject to the temperature of the ambient atmosphere in, said enclosure, and located also in the zone of influence of said heater means, said thermo-responsive means dominating said switches to close said first switch and open said second switch whenever the temperature of said thermo-responsive means is above a predetermined maximum and to close said second switch and open said first switch whenever the temperature of said thermo-responsive means is below a predetermined minimum, whereby said fan will be continuously driven and said heater means will be continuously deenergized when such ambient temperature is above said maximum, said fan will be continuously undriven and said heater means will be continuously energized when such ambient temperature is so low that said heater means is ineffective to raise the temperature of said thermo-responsive means to said predetermined maximum, and said fan will be intermittently driven and said heater means will be alternatively intermittently energized when said ambient temperature is between such extreme values.

References Cited in the file of this patent

UNITED STATES PATENTS

| | | |
|---|---|---|
| 29,307 | Parrott | July 24, 1860 |
| 1,583,496 | Shafer | May 4, 1926 |
| 1,676,923 | Phelan | July 10, 1928 |
| 1,726,225 | Hoff | Aug. 27, 1929 |
| 1,778,560 | Marsh et al. | Oct. 14, 1930 |
| 1,818,546 | Evans | Aug. 11, 1931 |
| 2,342,998 | Bieret | Feb. 29, 1944 |
| 2,552,966 | Harp | May 15, 1951 |

FOREIGN PATENTS

| | | |
|---|---|---|
| 711,150 | France | June 23, 1931 |